United States Patent
Alard et al.

(10) Patent No.: US 7,242,721 B2
(45) Date of Patent: Jul. 10, 2007

(54) METHOD FOR ESTIMATING THE TRANSFER FUNCTION OF A MULTICARRIER SIGNAL TRANSMISSION CHANNEL AND CORRESPONDING RECEIVER

(75) Inventors: Michel Alard, Paris (FR); Alexandre Rouxel, Rennes (FR); Nathalie Goudard, Courbevoie (FR); Franck Bietrix, Paris (FR)

(73) Assignee: Wavecom, Issy-Les-Moulineaux Cedex (FR)

( * ) Notice: Subject to any disclaimer, the term of this patent is extended or adjusted under 35 U.S.C. 154(b) by 538 days.

(21) Appl. No.: 10/479,190

(22) PCT Filed: May 15, 2002

(86) PCT No.: PCT/FR02/01639

§ 371 (c)(1),
(2), (4) Date: Nov. 26, 2003

(87) PCT Pub. No.: WO02/098095

PCT Pub. Date: Dec. 5, 2002

(65) Prior Publication Data

US 2004/0240570 A1  Dec. 2, 2004

(30) Foreign Application Priority Data

May 30, 2001 (FR) .................................. 01 07106

(51) Int. Cl.
*H04K 1/10* (2006.01)
*H04L 27/28* (2006.01)

(52) U.S. Cl. .......................... 375/260; 375/259; 455/59

(58) Field of Classification Search ................ 375/259, 375/260; 455/59

See application file for complete search history.

(56) References Cited

U.S. PATENT DOCUMENTS 5,164,727 A * 11/1992 Zakhor et al. .............. 341/143

(Continued)

FOREIGN PATENT DOCUMENTS

EP  0 802 656  10/1997

(Continued)

OTHER PUBLICATIONS

R. Chapman, T.S.Durrani, Optimal Cumulant Domain Filtering, Signal Processing Division, Electronic & Electrical Engineering Dept., University of Strathclyde, Glasgow, G1 IXW, UK.*

*Primary Examiner*—David C. Payne
*Assistant Examiner*—Erin M. File
(74) *Attorney, Agent, or Firm*—Westman, Champlin & Kelly

(57) ABSTRACT

The invention concerns a method for estimating the transfer function of a multicarrier signal transmission channel consisting of a temporal succession of symbols of a set of data elements, each of the data elements modulating a carrier frequency of the signal, the data elements comprising pilots and so-called informative data elements. The invention is characterized in that said method comprises: a step which consists in determining a set of two-dimensional discrete prolate spheroidal sequences (DPSS); a step which consists in writing the transfer function in the form of a combination of at least some of the two-dimensional discrete prolate spheroidal sequences (DPSS); a step which consists in time-based and frequency-based two-dimensional interpolation of at least some of the coefficients of the combination, so as to obtain an estimation of the transfer function at any point of a time-frequency network.

15 Claims, 6 Drawing Sheets

U.S. PATENT DOCUMENTS

| | | | | |
|---|---|---|---|---|
| 5,471,497 | A | * | 11/1995 | Zehavi ........................ 375/142 |
| 5,909,470 | A | * | 6/1999 | Barratt et al. ................ 375/324 |
| 6,327,314 | B1 | * | 12/2001 | Cimini et al. ............... 375/340 |
| 6,545,997 | B1 | * | 4/2003 | Bohnke et al. ............. 370/347 |
| 7,002,939 | B1 | * | 2/2006 | Hiramatsu .................. 370/335 |
| 7,079,606 | B2 | * | 7/2006 | Voyer ......................... 375/345 |
| 2002/0021749 | A1 | * | 2/2002 | Lee et al. .................... 375/150 |
| 2002/0039383 | A1 | * | 4/2002 | Zhu et al. .................... 375/214 |
| 2002/0115412 | A1 | * | 8/2002 | Bonhomme ................ 455/67.1 |
| 2005/0118956 | A1 | * | 6/2005 | Haeb-Umbach et al. . 455/67.11 |

FOREIGN PATENT DOCUMENTS

EP 0 838 928 4/1998

* cited by examiner

METHOD FOR ESTIMATING THE TRANSFER FUNCTION OF A MULTICARRIER SIGNAL TRANSMISSION CHANNEL AND CORRESPONDING RECEIVER

CROSS-REFERENCE TO RELATED APPLICATION

This Application is a Section 371 National Stage Application of International Application No. PCT/FR02/01639 filed May 15, 2002 and published as WO 02/098095 on Dec. 5, 2002 not in English.

FIELD OF INVENTION

The domain of this invention is transmission or broadcasting of digital data and/or sampled analogue data, particularly from and/or to mobile terminals.

BACKGROUND OF THE INVENTION

Multicarrier modulations associated with error correction coding and interlacing have demonstrated their advantages particularly for high speed transmissions in a radio mobile environment as illustrated in patents FR-86 09622 and FR-95 05455 dealing with the OFDM (Orthogonal Frequency Division Multiplexing) modulation and IOTA (Isotropic Orthogonal Transform Algorithm) modulation.

In the case of a coherent demodulation of received data, it is essential to be able to make a good estimate of the channel at all points in a time-frequency plane, in order to correctly demodulate the information received by the receiver.

In particular, the invention relates to optimisation of channel estimating techniques in the case of a multiple carrier transmission, called multicarrier transmission.

Usually, when data are transmitted on a radio channel at high speed, the signal is subjected to Doppler effects (related to movements of the transmitter, receiver or any reflectors) and multiple path problems (for example related to reflection of the signal on different objects) causing a delay spread or variations of the signal amplitude. These effects depend particularly on the time and frequency considered. Thus, a channel with a variable time and frequency is complex and it has to be estimated correctly in order to be able to decode received data reliably.

According to the state of the art, in the case of a multicarrier modulation, the channel estimate from which degradations caused by a radio mobile channel can best be corrected, consists of the following steps:
  insert reference carriers into the flow of information carriers at locations known to the receiver;
  making use of values taken by these references in reception, to deduce the channel transfer function at these points in the time-frequency plane; and
  starting from these results, obtain the channel transfer function on all points in a time-frequency network.

There are two particular methods of doing this:
  the estimate by scattered pilots; in transmission, pilot symbols are distributed regularly in the time-frequency plane. An undersampled version of the channel is obtained starting from these pilots. In reception, a two-dimensional interpolation is carried out in time and frequency to determine the value of the channel at all points in the time-frequency network. This method is used particularly by the DVB-T (Digital Video broadcasting —Terrestrial) standard.
  the estimate by reference multicarrier symbol (also called preamble); at least one reference symbol is placed at the beginning of a frame emitted on the channel. With this or these symbols, the channel is estimated in reception of the frame transmitted on each carrier. The channel can be considered as being quasi-static on a given frame (choice of system parameters such that the channel varies slowly compared with the symbol time), the channel estimate on the reference symbol(s) is valid for all OFDM symbols in the frame (in particular this method is applied to the ETSI (European Telecommunication Standard Institute) HIPERLAN/2 standard.

In the case of a scattered pilots estimate, the complexity of the channel estimator is usually limited by using two single-dimensional interpolation filters instead of a two-dimensional filter. The implementation complexity is then significantly lower for an acceptable degradation of the estimating quality.

For example for DVB-T, a Wiener filter is used for the frequency interpolation while the time interpolation is a simple linear interpolation. The linear interpolation is not optimum but its complexity is lower than the complexity of a two-dimensional FIR filter or two single-dimensional FIR filters in cascade.

Therefore, the interpolation is done in time and then in frequency.

Furthermore, it is difficult to make a Wiener filter adaptive, in other words to recalculate the coefficients of the reception filter as a function of the channel parameters. Consequently, it systematically becomes necessary to size the filter for the worst Doppler and delay spread case.

In particular, the purpose of the invention is to overcome these disadvantages of prior art.

More precisely, one purpose of the invention is to optimise decoding of a data frame emitted on a channel with a strong Doppler spread when multicarrier modulation is used.

Another objective is to optimise the estimate of the transfer function of a transmission channel within the framework of a multicarrier transmission.

Another purpose of the invention is to enable a fairly simple interpolation of the channel transfer function over an entire time-frequency network starting from estimated values of this function at locations of pilot symbols inserted in the transmitted data frame.

Another purpose of the invention is to offer a good compromise between the useful flow and the quality of the channel estimate.

SUMMARY OF THE INVENTION

These objectives, and others that will become clear later, are achieved by means of a method for estimating the transfer function for a multicarrier signal transmission channel formed by a series of symbols in time composed of a set of data elements, each data element modulating a carrier frequency of the signal, the data elements comprising firstly reference elements called pilots for which the transmission value is known to at least one receiver that will receive the signal, and secondly so-called information data elements representing at least one source signal to be transmitted.

According to the invention, this type of process comprises:
  a step to determine a set of two-dimensional Discrete Prolate Spheroidal Sequences (DPSS);

a step to write the transfer function in the form of a combination of at least some of the two-dimensional discrete prolate spheroidal sequences in the set;

a two-dimensional interpolation step in time and in frequency of at least some coefficients of the combination, so as to obtain an estimate of the transfer function at all points in a time-frequency network.

Note that a time-frequency space is a limited space of model type used to represent a multi-carrier signal.

Thus, the invention enables the implementation of an estimate of a transfer function for a multicarrier signal transmission channel with reasonable complexity and that can be used to decode information data elements reliably and efficiently even in the presence of a large Doppler effect and/or delay spread of the channel.

According to one particular characteristic, the process is remarkable in that the write step uses a projection of pilots on two-dimensional discrete prolate spheroidal sequences.

Thus, the invention advantageously allows the use of a base composed of two-dimensional DPSSs.

According to one particular characteristic, during the determination step, the method uses at least one step for selection of at least some discrete prolate spheroidal sequences, as a function of at least one characteristic of the transmission channel.

Thus, the invention preferably enables the selection of two-dimensional DPSSs, particularly well adapted for the channel, which significantly improves its reliability.

In this manner, sizing of the filter for the worst Doppler and channel delay spread case is no longer systematically necessary since the estimate is adapted to the channel.

According to one particular characteristic, the process is remarkable in that the characteristic(s) of the transmission channel include the maximum Doppler frequency and/or the maximum channel delay spread.

Thus, the invention can advantageously take account of important characteristics of the channel present particularly for communications from and/or to mobile terminals.

According to one particular characteristic, the process is remarkable in that the selection step uses a sub-step to sort two-dimensional discrete prolate spheroidal sequences as a function of a predetermined energy criterion.

Thus, the invention advantageously only considers useful and/or necessary DPSSs. This limits the complexity of implementation while maintaining good reliability of the estimate of the transfer function.

According to one particular characteristic, the process is remarkable in that the number of two-dimensional discrete prolate spheroidal sequences selected during the selection step takes account of at least one transfer function estimate quality criterion.

Advantageously, the invention provides a means of estimating the transfer function in a manner suited to the required quality.

According to one particular characteristic, the process is remarkable in that the number of two-dimensional discrete prolate spheroidal sequences selected during the selection step is less than or equal to the number of signal pilots.

According to one particular characteristic, the process is remarkable in that during the determination step, a two-dimensional DPSS is obtained by taking a tensor product of at least two single-dimensional DPSSs.

Thus, the invention advantageously enables the use of two-dimensional DPSSs while limiting the complexity, by carrying out a judicious operation on at least two single-dimensional DPSSs. This is possible particularly if it is considered that the channel can be separated in time and in frequency.

According to one particular characteristic, the process is remarkable in that it uses an estimate-maximisation algorithm.

Thus, if the channel estimate quality obtained is not sufficient, the estimate-maximisation algorithm can advantageously improve it.

According to one particular characteristic, the process is remarkable in that during the writing step, it includes at least one step for estimating at least some coefficients of the combination using a least squares method.

The invention also uses a method for reception of a digital signal, remarkable in that it uses a step for estimating a signal transmission channel transfer function according to the method of estimating the transfer function of a multicarrier signal transmission channel.

The invention also relates to a multicarrier signal receiver formed from a time sequence of symbols composed of a set of data elements, each data element modulating a signal carrier frequency, the data elements comprising firstly reference elements called pilots for which the value on emission is known to at least one receiver that will receive the signal, and also information data elements representing at least one source signal to be transmitted.

The receiver is remarkable in that it includes:
means of memorising a set of two-dimensional discrete prolate spheroidal sequences (DPSSs);
means of writing a transfer function for a signal transmission channel in the form of a combination of at least some of the two-dimensional discrete prolate spheroidal sequences in the set;
means of making a two-dimensional interpolation in time and in frequency of at least some coefficients in the combination, so as to obtain an estimate of the transfer function at all points in the time-frequency network.

The invention also relates to an application of the method of estimating the transfer function of a multicarrier signal transmission channel in at least one of the following domains:
terrestrial digital broadcasting;
digital radio communications;
submarine data transmission.

The advantages of the reception process, the receiver and the application of the estimating process are the same as the advantages of the process for estimating the channel transfer function, and are not described in more detail.

BRIEF DESCRIPTION OF THE DRAWINGS

Other characteristics and advantages of the invention will become more obvious after reading the following description of a preferred embodiment given as a simple illustrative and non-limitative example, and the attached drawings among which.

DETAILED DESCRIPTION OF THE PREFERRED EMBODIMENTS

Figure 1:
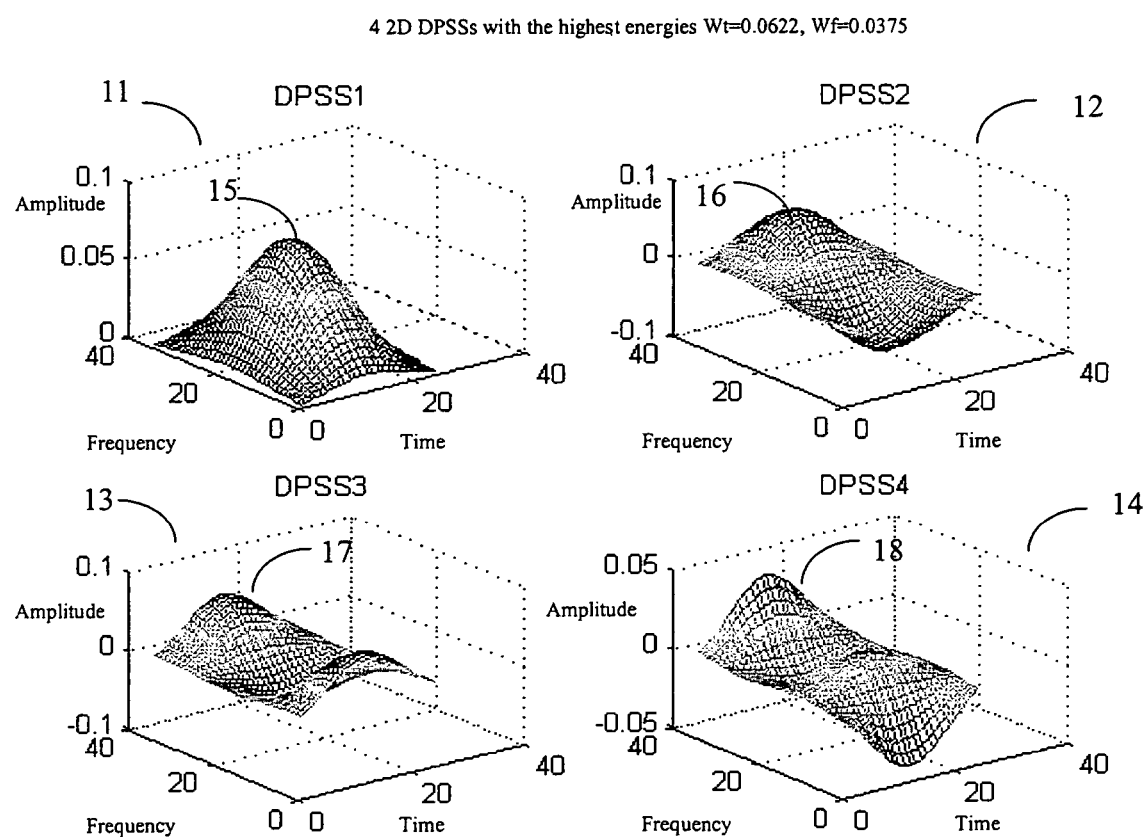
FIG. 1 illustrates two-dimensional DPSSs according to the invention.

The general principle of the invention is based on a two-dimensional interpolation technique concerning the scattered pilots estimate and more precisely the use of restrictions of two-dimensional Discrete Prolate Spheroidal Sequences (DPSS), the number of sequences being adapted to the characteristics of the channel considered and preferably not permanently fixed as a function of the worst propagation case.

The invention consists of using two-dimensional DPSSs that can be used in particular in cases in which the Doppler spread and Inter-Symbol Interference (ISI) of the channel (Doppler delay channel), such as satellite communication systems or mobile communication systems, and thus enable an optimum channel estimate in the case of a multicarrier system.

For a channel with a delay spread and Doppler effect, the channel transfer function that is locally stationary is modelled by narrow band white noise in two-dimensions (time and frequency). Its two-dimensional Doppler Power Spectrum is assumed to be flat (there is no prior information about the propagation channel), which encompasses all possible Doppler spread and time delay cases.

The size of the estimating window is limited and the number of two-dimensional DPSSs used is adapted as a function of the size of the estimating window.

Under these conditions, the use of two-dimensional DPSSs provides a means of obtaining a high quality channel estimate, while optimising the number of pilots for a reasonable implementation complexity. This estimating technique consists of interpolating the estimate of the coefficients of the discrete channel decomposition, obtained by pilot symbols based on two-dimensional DPSSs.

More precisely, in the two-dimensional case which is the purpose of this invention, the variable transfer function of the channel is modelled by two-dimensional narrow band noise. Since the receiver usually has incomplete knowledge of the characteristics of its local oscillator and of the delay-Doppler spectrum of the two-dimensional channel, this spectrum is assumed to be flat, with bounded support and with a width equal to the Doppler $B_D$ spread on the frequency axis and the maximum delay $T_{max}$ on the time axis. Therefore, it is modelled by a parallelepiped, defined as being the smallest parallelepiped encompassing the real support. Therefore, this model includes all possible delay and Doppler cases.

Self-correlation of T(f,t) for the Doppler power spectrum defined above, can be separated in time and frequency in the form:

$$R_T(\Delta f, \Delta t) \triangleq E[T(f,t)T*(f+\Delta f, t+\Delta t)]$$
$$= N_c \mathrm{sinc}(\pi \Delta f T_{max}) \mathrm{sinc}(2\pi \Delta t f_D)$$

where $T_{max}$ is the maximum spread, $2f_D$ is the Doppler spread, f is a frequency, $\Delta f$ is a frequency variation, t is a time, $\Delta t$ is a time variation and sinc is the cardinal sine function.

We will consider a block with dimensions $N_1 \times N_2$, where $N_1$ (number of time symbols, for example equal to 25) corresponds to the time dimension and $N_2$ (number of sub-carriers, for example equal to 35) corresponds to the frequency dimension. The parameters $N_1$ and $N_2$ are predetermined as a function of a given complexity and/or a compromise between the complexity and the required reliability of the estimate. The DPSSs are two-dimensional functions defined on the product space $C^{N_1} \times C^{N_2}$, where $C^{N_1}$ corresponds to the complex time space with $N_1$ dimensions and $C^{N_2}$ corresponds to the frequency space with $N_2$ dimensions.

Due to the separable nature of the channel in time and in frequency, these two-dimensional DPSSs are defined as the tensor product of single-dimensional DPSSs.

Thus defined, 2D (in other words two-dimensional) DPSSs can be used to obtain decorrelated channel decomposition coefficients:

Let $\underline{R_c}$ be the covariance vector of the channel, defined by:

$$\underline{\underline{R_c}} \triangleq \{E[c_{ij} c_{kl}^*]\}_{jkl}$$

where:

i and k are taken from 1 to $N_1$ and j and l are taken from 1 to $N_2$;

$C_{kl}*$ represents the conjugate of the complex value $C_{kl}$;

the function E[x] representing the expectancy or the average of the variable x; and the complex vector $\underline{c}$ to be estimated in this case representing an implementation of the two-dimensional discrete channel at the emitted data stream, and being composed of $N_1.N_2$ complex coefficients $c_{ij}$.

The channel can be separated, which is equivalent to writing that the vector $\underline{R_c}$ is the tensor product of covariance matrices corresponding to each of the time and frequency dimensions:

$$\underline{\underline{R_c}} = \{N_c \, \mathrm{sinc}(\pi(j-1)v_0 T_{max}) \mathrm{sinc}(2\pi(i-k)\tau_0 \cdot f_D)\}_{ijkl}$$
$$= N_c \underline{\underline{R^{(1)}}} \otimes \underline{\underline{R^{(2)}}}$$

where $\underline{\underline{R^{(1)}}} = \{\mathrm{sinc}(\pi(j-l)v_0 \cdot T_{max})\}_{jl}$; and where $\underline{\underline{R^{(2)}}} = \{\mathrm{sinc}(2\pi(i-k)\tau_0 \cdot f_D)\}_{ik}$ Therefore, the decomposition coefficients of the discrete channel based on 2D DPSSs are decorrelated.

It can be demonstrated that the 2D DPSSs thus created are actually eigenvectors of the order 4 covariance vector of the two-dimensional channel.

It is possible to find an orthonormed base for the complex space with $N_1.N_2$ dimensions $C^{N_1.N_2}$, for which the normalized vectors $\{\underline{p}^{(i,j)}\}$, i=1 ... $N_1$ and j=1 ... $N_2$ (where the notation x=a ... b means that values of x are taken from a to b) are the eigenvectors of the covariance vector.

Therefore the family of two-dimensional DPSSs is the family $$\{(\underline{p}^{(i,j)}, \lambda^{(1,i)}\lambda^{(2,j)})\}_{i=1\ j=1}^{N_1 N_2}$$

where:
the orthonormed two-dimensional DPSSs are the following matrices $$\underline{p}^{(i,j)} = \{(Pk^{(1,i)}, Pl^{(2,j)})\}_{k=1\ l=1}^{N_1 N_2}$$

and the associated eigenvalues are $\lambda^{(1,i)}.\lambda^{(2,j)}$
where:

$$\{(\underline{p}^{(1,i)}, \lambda^{(1,i)})\}_{i=1}^{N_1} \text{ and } \{(\underline{p}^{(2,i)}, \lambda^{(1,i)})\}_{j=1}^{N_2}$$

two families of single-dimensional DPSSs on the time dimension and the frequency dimension respectively, and their associated eigenvalues.
The $$\{\underline{p}^{(1,i)}\}_{i=1}^{N_1}$$

sequences are time sequences with size $N_1$ with a limited normalized band $[-W_p, W_t]$ and the sequences $$\{\underline{p}^{(2,j)}\}_{j=1}^{N_2}$$

are frequency sequences with size $N_2$ with normalized limited band $[0; 2W_f]$ where $W_t = f_D \times \tau_0$ and $$\frac{T_{max} \times v_0}{2}.$$

Vectors corresponding to the time dimension are equal to the restriction of $N_1$ DPSSs, real discrete time sequences with dimension $N_1$ and with a normalized limited band $[-W_p; W_t]$ concentrated mostly on the discrete interval $$\underset{n=0}{i}{\overset{N_1-1}{}}$$

corresponding to the restriction to the time support of the transmitted block. By definition, the most concentrated DPSSs are those with the greatest energies within the interval considered.

Similarly, vectors corresponding to the frequency dimension are equal to the restriction of the $N_2$ DPSSs, real discrete frequency sequences with dimension $N_2$ and with a limited normalized band $[0; 2W_f]$ with their greatest concentration on the discrete interval $$\underset{n=0}{i}{\overset{N_2-1}{}}$$

corresponding to the restriction to the frequency support of the transmitted block.

The decomposition coefficients of the two-dimensional discrete channel are then given by:

$$\underline{c} = \sum_{i=1}^{N_1} \sum_{j=1}^{N_2} b_{ij} \underline{p}^{(i,j)}$$

For reasons of clarity, in the remaining part of this description we will use a single index giving:

$$\underline{c} = \sum_i b_i \underline{p}^{(i)}$$

Therefore, the choice of the right single-dimensional functions provides a means of building good two-dimensional interpolation functions.

Only the most concentrated DPSSs are necessary to describe the channel. Only the most concentrated N' 2D DPSSs are kept to interpolate the channel.

According to the preferred embodiment, the N' most concentrated 2D DPSSs are obtained by calculating the $N_1$ eigenvalues $\lambda^{(1,i)}$ in the time dimension, and the $N_2$ eigenvalues $\lambda^{(2,j)}$ in the frequency dimension, and then selecting the N' highest values of the products $\lambda ij = \lambda^{(1,i)}.\lambda^{(2,j)}$.

According to a variant that is less complex but gives a worst estimate (for a given number of selected 2D DPSSs) than the preferred embodiment, the selection is simplified by firstly selecting the $N'_1$ highest values for $\lambda^{(1,i)}$ and the $N'_2$ highest values for $\lambda^{(2,j)}$, to obtain N' (in this case equal to $N'_1.N'_2$) values giving the most concentrated 2D DPSSs.

Therefore, the channel estimate corresponds to:

$$\hat{\underline{c}}^{(N')} = \underline{c} + \underline{n}_c$$

where $\underline{n}_c$ is the estimate noise.

By analogy with the signal to noise ratio, the quality criterion of the following estimate is defined as follows:

$$Q(N') = \frac{E[\|\underline{c}\|^2]}{E[\|\underline{n}_c\|^2]} \text{ where } \|.\|$$

defines the norm of a matrix.
Therefore we can write:

$$Q(N') = \frac{\sum \text{Eigenvalues of all } SSADs}{\sum \text{Eigenvalues of rejected } SSADs}$$

In the first step of the estimating algorithm, the coefficients are obtained by projecting reference symbols on DPSSs that are kept. Since not all DPSSs are kept to estimate the channel, these projections give an acceptable approximation of the channel decomposition.

In one preferred embodiment, we restrict the discussion to the projection of reference symbols on kept DPSSs without using an EM (Estimate—Maximisation) algorithm described later.

Nevertheless, as a variant, in order to optimise the channel estimate for arbitrary synchronization reasons and taking account of all or some of the coded structure of the transmitted data, an estimate—maximisation algorithm is used in a manner similar to that presented in patent FR-96 05200 (deposited by the same applicants and entitled "Signal Numérique à blocs de reference multiples pour l'estimation de canal, procédés d'estimation de canal et récepteurs correspondants" ("Digital signal with multiple reference blocks for channel estimating, channel estimating methods and corresponding receivers"). In this way, not only are the reference sub-carriers used, but useful carriers are also used in order to improve the estimator quality in terms of the Maximum A Posteriori (MAP) probability criterion.

As an illustration, FIG. 1 shows DPSSs 15 to 18 on graphs 11 to 14. For example, in this case we will consider the case of a "Vehicular B at 250 km/h" type model where $f_D$ is close to 930 Hz, $T_{max}$ equals 20 µs, $\tau_0$ is equal to 133.33 µs and $v_0$ is equal to 3.75 kHz. It is deduced that time is limited to one interval [−Wt, +Wt] where Wt is equal to 0.0622 and frequencies are limited to an interval [0, +Wf] where Wf is equal to 0.0375. According to one example considered, in this case it was decided to represent the four two-dimensional DPSSs with the highest energy (the energy of one DPSS being equal to the product of the eigenvalues of the two corresponding 1D DPSSs, namely $\lambda^{(1,i)} \lambda^{(2,j)}$) depending on their amplitude (vertical axis) as a function of the time and frequency (horizontal axes) (whereas in fact, for example, the 25 highest energy two-dimensional DPSSs were kept to estimate the channel).

We will now describe details of how single-dimensional DPSSs families are obtained.

Consider the case of the time dimension (the frequency dimension is similar).

The complex vector $\underline{c}$ corresponding to the time dimension to be estimated in this case represents an embodiment of the discrete channel at the transmitted data stream, and in this case is composed of N (equal to $N_1$) complex coefficients $c_n$.

It is possible to find an orthonormed base for the complex space with N dimensions $C^N$, for which the normalized vectors $\{p^{(i)}\}$, i=1 . . . N are the eigenvectors of the covariance matrix of $\underline{c}$ associated with the eigenvalues $\{\lambda_i\}$, i=1 . . . N.

The Doppler spectrum of the channel in this case is assumed to be flat with a bounded support and a width equal to the Doppler spread $B_D=2f_D$, $f_D$ representing the maximum Doppler frequency.

In this case, these vectors are equal to the restriction of N DPSSs, real discrete sequences with dimension N and with a normalized limited band [−W';W'] where W'=$W_r$=the most concentrated $f_D \times \rho_0$ in the discrete interval $$\{n\}_{n=0}^{N-1},$$

corresponding to the restriction to the time support of the transmitted block. By definition, the most concentrated DPSSs are the DPSSs with the highest energies within the interval considered. Thus, we only keep the N DPSSs with the highest energy and the others are rejected.

In other words, $$\underline{c} = \sum_{i=1}^{N} b_i \underline{p}^{(i)}$$

where the factors $b_i$ are independent complex gaussian random variables satisfying the following relations:

the variance of the variables $b_i$ is equal to $\lambda_i$:

$$E[|b_i|^2]=\lambda_i \quad \text{(relation(1))}$$

the covariance between $b_i$ and $b_j$, where i and j are different is zero:

$$E[b_i b_j^*]=0 \text{ if } i \neq j$$

where the variable $b_j^*$ is the conjugate of the complex variable $b_j$.

The basic vectors (in other words the DPSSs that were kept) are given by the relation:

$$E[\underline{c}.\underline{c}^H].\underline{p}^{(i)}=\lambda_i \underline{p}^{(i)}$$

where $(.)^H$ is the transposition—conjugation operator of the vector (.).

The $\{p^{(i)}\}$, i=1 . . . N vectors satisfy the following system of equations:

$$2W' \sum_{j=1}^{N} \mathrm{sinc}(2W'(n-j))p_j^{(i)} = \lambda_i p_n^{(i)}$$

$$n = 1 \ldots N$$

which corresponds to the definition of single-dimensional DPSSs with size N and a normalized band [−W';W'].

Figure 2:
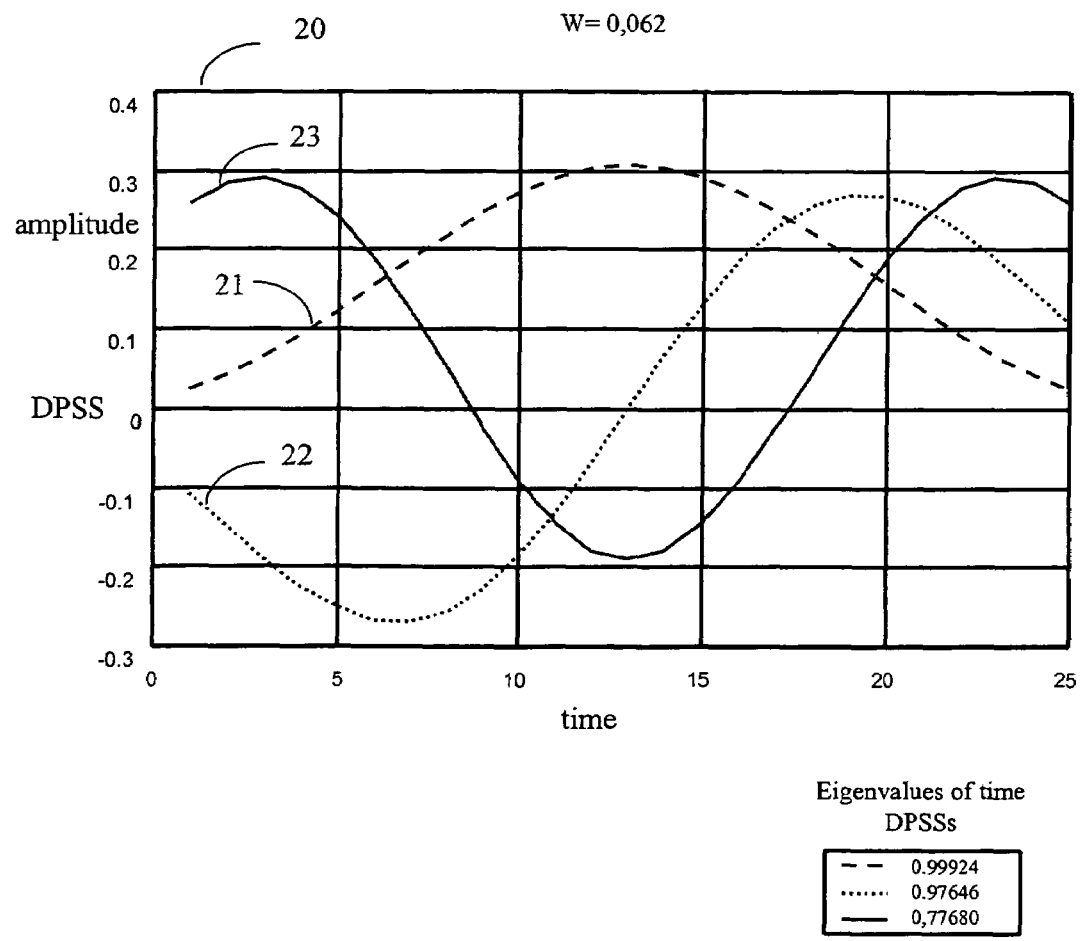
FIG. 2 illustrates single-dimensional DPSSs used to make two-dimensional DPSSs as illustrated in FIG. 1.

For example, FIG. 2 shows an example of single-dimensional DPSSs. The 25 highest energy DPSSs are selected in this example (N is equal to 25). Graph 20 shows the three DPSSs 21, 22 and 23 with the highest energy for which the amplitude (ordinate axis) is given as a function of time (abscissa axis for which the scale is in normalized units, in other words as a number of symbol times). The concentration or energy of the DPSSs depends on the eigenvalues; as the modulus of an eigenvalue corresponding to a DPSS increases, the energy of the corresponding DPSS also increases. Note that the three DPSSs 21, 22 and 23 sorted in decreasing order of energy correspond to three eigenvalues equal to 0.99924, 0.97646 and 0.77680 respectively (which are therefore also sorted in decreasing order).

Since the concentration of a DPSS is equal to the $n^{th}$ eigenvalue $\lambda_n$ of the covariance matrix of $\underline{c}$, relation (1) shows that only the most concentrated DPSSs are necessary to describe the channel.

Figure 3:
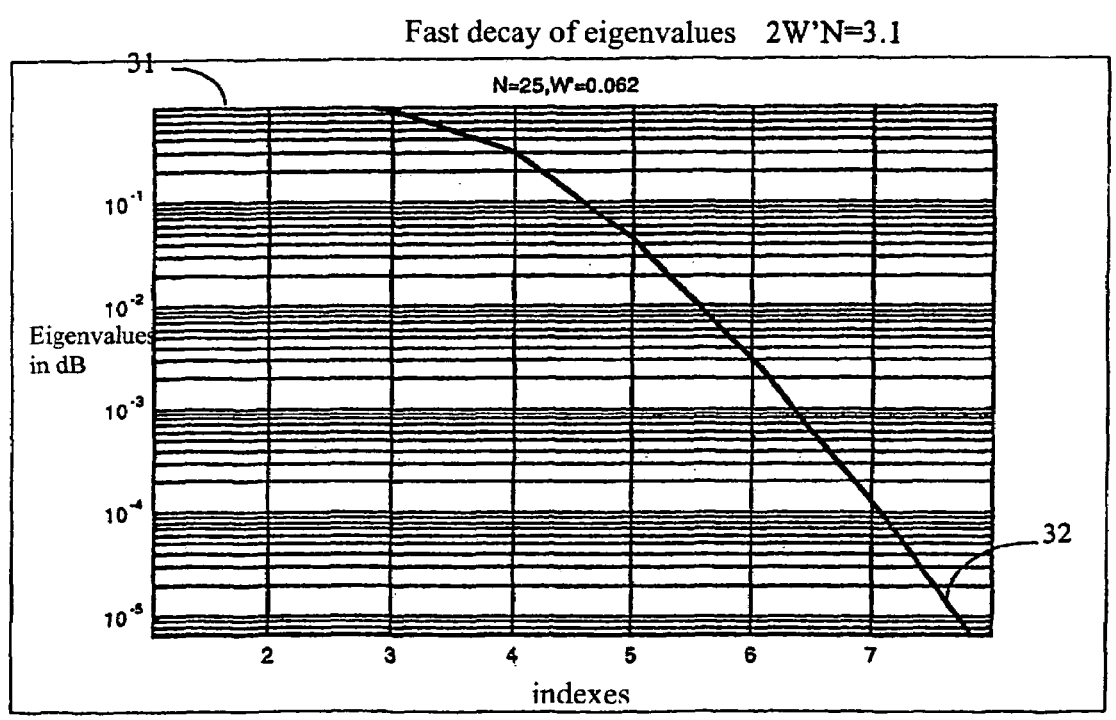
FIG. 3 illustrates the fast decay of the eigenvalues of a single-dimensional DPSS in FIG. 2.

It is assumed that these eigenvalues are stored in decreasing order. The article "Prolate Spheroidal Wave Function, Fourier Analysis and Uncertainty-I" written by D. SLEPIAN and H. O. POLLAK published in the "The Bell System Technical Journal" in January 1961, demonstrates that these eigenvalues have a very fast decay and quickly disappear after 2W'N values. Note that according to the example illustrated in FIG. 3, the product 2W'N is equal to 3.1 for values of W' and N equal to 0.062 respectively, and that the eigenvalues expressed in dB (in other words according to a 10 $\mathrm{Log}(\lambda^2/\lambda_0^2)$ type scale, where $\lambda$ represents the value considered and $\lambda_0$ is the largest eigenvalue) decay very quickly after this threshold of 3.1.

The DPSS family is orthogonal. However, there is nothing to assure that undersampled DPSSs are orthogonal. Therefore, projection of reference symbols onto these DPSSs gives an approximation of the channel decomposition.

The following three steps are carried out during the channel estimate:

the receiver uses N' reference symbols of the modulated block to calculate the coefficient $d_i$ corresponding to the channel decomposition on the reduced family of N' DPSSs. Due to the presence of an additive noise, the following weighting coefficients $w_i$ are applied to the result obtained:

$$w_i = \frac{\lambda_i}{\lambda_i + \frac{N_0}{N_c E_s}}$$

where $N_c$ is the channel variance, $N_0$ is the additive noise variance, and $E_s$ is the energy of the transmitted reference symbols.

The result for the estimate of the decomposition coefficients is then:

$\hat{b}_i = w_i d_i$ i=1 ... N'

The EM (Estimate —Maximisation) algorithm is used to improve the estimates obtained. Independence of the coefficients $b_i$ simplifies calculations of the maximisation step. To improve the estimates obtained, the EM algorithm described in detail in patent FR-96 05200 mentioned above uses not only the reference subcarriers but also the useful carriers in order to improve the estimator quality in terms of the Maximum A Posteriori (MAP) probability criterion.

The receiver then determines a channel estimate by making an interpolation using the kept DPSSs.

The reader can refer to patent FR-96 05200 mentioned above for further details about use of single-dimensional DPSSs.

Figure 4:
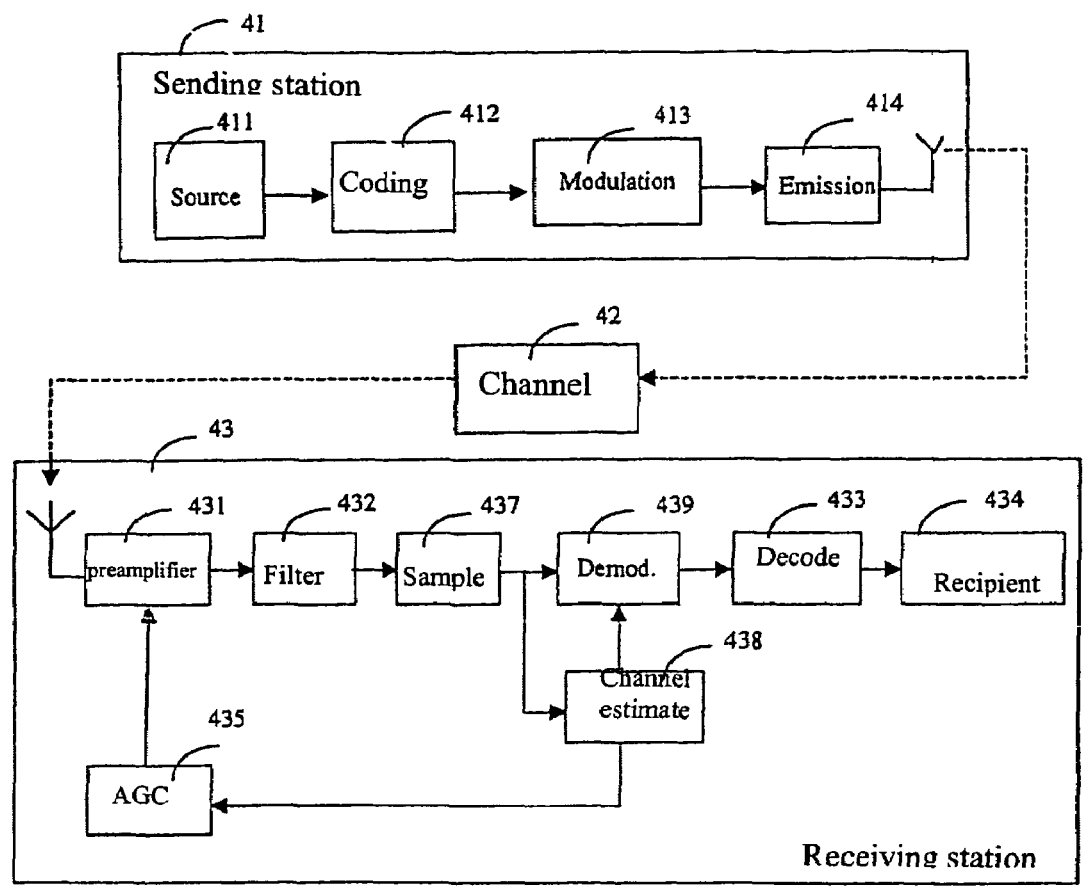
FIG. 4 shows a simplified block diagram of a transmitter station and a receiver station using two-dimensional DPSSs as illustrated with reference to FIG. 1.

We will now present an embodiment of the channel estimate according to the invention, with reference to FIG. 4.

FIG. 4 shows a simplified diagram illustrating particularly:
- a transmitting station 41 transmitting a signal formed of a modulated data stream according to the invention;
- a transmission channel 42 for the transmitted signal; and
- a receiving station 43 for the transmitted signal, particularly including a channel estimate according to the invention.

In particular, the transmitting station 41 comprises an information source 411 with an arbitrary flow generating binary or non-binary data corresponding to an arbitrary type of source signals (sound, picture, data, etc.). These data may be subjected to source and channel coding 412. Channel coding uses an error correction code adapted to the transmission channel 42.

Coded data generated from these codes (useful symbols) are then organized into data streams, and are modulated (413). Therefore, they are suitably distributed and interleaved onto several data streams in order to obtain the necessary diversity and to decorrelate fading affecting the transmitted symbols. Reference elements are also introduced into each data stream, according to distribution principles specified later. Finally, the data are modulated according to OFDM/QAM (Quadrature Amplitude Modulation) type modulation (for example OFDM with guard interval), or OFDM/OQAM (Offset Quadrature Amplitude Modulation) (for example the IOTA modulation). Note that reference symbols are inserted in the block to be transmitted after the "mapping" and before the OFDM modulator. These symbols are uniformly distributed in the time-frequency plane. Refer to patents FR-86 09622 and FR-95 05455 for a detailed description of the modulation system.

The signal is then transposed in frequency, and is amplified and transmitted by the transmitter 414 through the channel 42.

The channel 42 is an arbitrary radio transmission channel. The signal passes in channel 42 and in this channel, for example, noise may be added, it may follow multiple paths, or interference may be introduced, or it may be influenced by the Doppler effect.

Those skilled in the wireless transmission field usually models the channel, particularly so as to optimise coding/decoding and modulation/demodulation.

In this case, according to one model of this channel, it is assumed that the channel is affected by:
- white gaussian noise characterised by a Signal to Noise Ratio (SNR) assumed to be known;
- the Doppler effect, for which the power spectrum is normalized by a parallelepiped of normalized half bands $W^t$ and $W^f$ and
- delay spread (particularly related to multiple paths resulting from signal reflections on environmental elements (for example buildings)).

Some of these models are normalized. For example, it can be assumed that channel 42 can be modelled using the "Vehicular B" type at 250 km/h described in the ETSI report "TR 101 112 V3.2.0 appendix B.1 ETSI" that is typical of a channel between a fixed station and a vehicle moving at a speed equal to 250 km/h.

Input stages in the receiving station 43 are conventional. The receiving station 43 receives the signal sent by the transmitting station 41 and transmits it through the channel 42. The signal corresponding to a received data stream is preamplified 431 and is then converted into an intermediate frequency in order to achieve tuned filtering of channel 432. The intermediate frequency signal is then converted into base band on two channels in quadrature, and is then sampled (437).

The receiver uses the samples corresponding to a data stream to determine an estimate 438 described in detail below.

This estimate enables a reliable demodulation 439 of the samples.

The demodulated data are then decoded, possibly de-interleaved to be transmitted to the recipient 434.

The channel estimate also enables automatic gain correction (AGC) 435 that controls the preamplification 431.

In this case, it is assumed that the data streams are short. There is no need for synchronization. As a variant, for long data streams, synchronization taking account of the samples makes it possible to synchronise correctly on transmitted symbols and/or the data stream itself to sample the received signal correctly.

Figure 5:
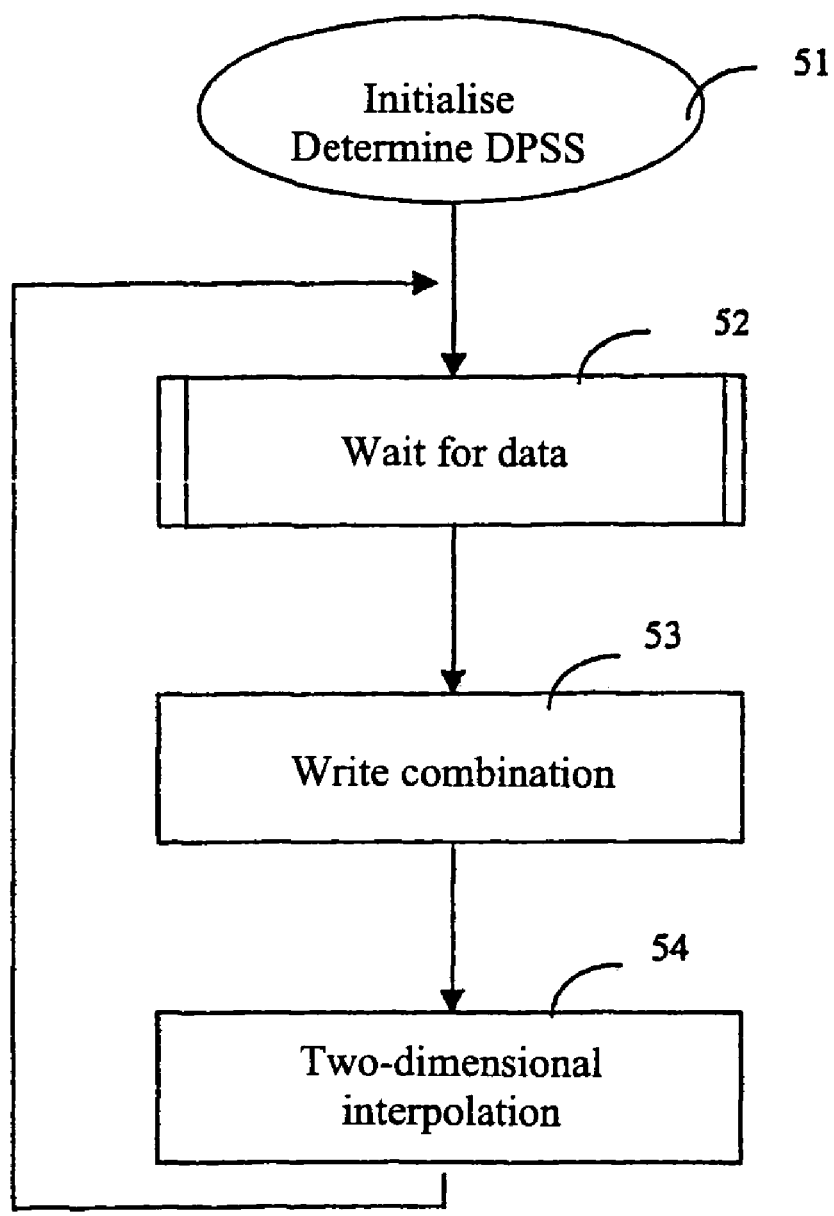
FIG. 5 contains a flowchart used in a channel estimating module illustrated in FIG. 4.

We will now describe the channel estimate 438 according to the invention in detail, with reference to the flowchart described in FIG. 5.

The two-dimensional DPSSs adapted to the channel type used are determined in an initialisation step 51, using the following method.

It is assumed that system parameters (in other words the symbol time $\tau_0$ and the space between subcarriers $\nu_0$) were chosen such that the channel 42 can be considered as being quasi-constant on the scale of an OFDM mesh ($\tau_0$, $\nu_0$) (an OFDM mesh corresponds to an area with dimension $\tau_0$ in time and $\nu_0$ in frequency in the time-frequency network), namely:

$$\begin{cases} v_0 << \dfrac{1}{T_{\text{Max}}} = B_c \\ \tau_0 << \dfrac{1}{2f_D} = T_c \end{cases}$$

where $B_c$ represents the channel consistency band; and
$T_c$ represents the channel consistency time.
(the "<<" symbol means "very much less than").

The channel then behaves like a multiplication channel, characterised by an amplitude and a phase corresponding to the value of $T(f,t)$, a variable transfer function of the channel, for the time and frequency considered.

Therefore, for the mesh corresponding to a transmitted symbol $\alpha_{m,n}$ we have:

$T(f,t) = T(mv_0, n\tau_0)$ and
$\tau(mv_0, n\tau_0) = \rho_{m,n} e^{i\theta_{m,n}}$ where $\rho$ represents an amplitude and $\theta$ represents a phase.

Let us use the following matrix notation:

$\underline{\alpha} \triangleq \{\alpha_{m,n}\}_{m,n}$ transmitted binary symbols matrix
$\underline{r} \triangleq \{r_{m,n}\}_{m,n}$ matrix of samples received at the output from the demodulator
$\underline{c} \triangleq \{T(mv_0, n\tau_0)\}_{m,n}$ matrix of discrete channel coefficients
$\underline{n} \triangleq \{n_{m,n}\}_{m,n}$ matrix of coefficients of discrete complex gaussian additive white noise The discrete channel is modelled by the following relation:

$\underline{r} = \underline{c} \cdot \underline{\alpha} + \underline{n}$ where the "·" operator represents the term-by-term product.

Similarly, since the channel is locally considered as a multiplication channel:

$r_{m,n} = C_{m,n} \alpha_{m,n} + n_{m,n}$

It is required to determine the values $C_{m,n}$.

Remember that the reference symbols are inserted in the block to be transmitted before the OFDM modulator and these symbols are uniformly distributed in the time-frequency plane.

The characteristics of the propagation channel, namely maximum Doppler spread (bilateral) and maximum delay spread (unilateral) are assumed to be known (for example, these values can be estimated using a channel model and/or they can be measured).

It is assumed that the Doppler Power Spectrum of the channel is modelled by a parallelepiped of normalized half-bands $W_t$ and $W_f$ (as specified in the description of the general principle of the invention):

$W_t = f_D \times \tau_0$ and $W_f = \dfrac{T_{\max} \times v_0}{2}$

The single-dimensional DPSSs corresponding to these normalized bands are calculated in advance:

In the time dimension: let $R(N, W_t)$ be the covariance matrix with dimension N (corresponding to the time dimension of the treated block) of complex white noise with $2W_t$ normalized bands, $R_{m,n} = 2W_t \sin(2\pi W_t(m-n))$ 1D DPSSs (in other words single-dimensional) corresponding to the time dimension are defined as being normalized eigenvectors of the matrix $R(N,W_t)$, sorted in increasing order of their eigenvalues.

In the frequency dimension: The procedure is similar: Let $R(N, W_f)$ be the covariance matrix with dimension N (corresponding to the frequency dimension of the block being considered) of complex white noise with $2W_f$ normalized bands, $R_{m,n} = 2W_f \sin(2\pi W_f(m-n))$ 1D DPSSs corresponding to the frequency dimension are defined as being normalized eigenvectors of the matrix $R(N,W_f)$ sorted in increasing order of their eigenvalues.

The 2D (in other words two-dimensional) DPSSs are then constructed using term by term multiplication of 1D DPSSs corresponding to a time dimension and a 1D DPSS corresponding to a frequency dimension:

$P_{ij} = P_i P_j^T$; and
$\lambda_{ij} = \lambda_i \lambda_j$ where:

$P_{ij}$ defines a two-dimensional DPSS of eigenvalues
$P_i$ and $P_j$ correspond to single-dimensional DPSSs with the corresponding eigenvalues $\lambda_i$ and $\lambda_j$ (notations simplified to facilitate reading).

The DPSSs with the highest energies among the resulting DPSSs are selected.

According to a first embodiment, the number N' of 2D DPSSs selected is determined in advance and may for example be equal to approximately 25.

According to a second embodiment, the number N' of selected 2D DPSSs is such that the quality factor defined as being the ratio of the sum of eigenvalues to the sum of rejected eigenvalues is greater than a given quality factor $Q_0$ (for example of the order of 30 dB). In summary, the number N' is determined by the following criterion:

$$Q = \dfrac{\sum \text{all eigenvalues}}{\sum \text{rejected eigenvalues}} > Q_0$$

Thus, for a time-frequency block with a given size and given characteristics of the propagation channel, the number of two-dimensional DPSSs necessary for interpolation of the complex gain of the channel is generated from the estimate of this complex gain obtained at the locations of the pilot symbols.

Thus, during the initialisation step 51, the selected two-dimensional DPSS parameters are stored in the channel estimating module 438 of the receiving station.

Note that the two-dimensional DPSSs may be retained during the design of the channel estimating module 438 and may be used statically during a channel estimate.

According to a more complex variant (the complexity remaining reasonable, due to the method of building up 2D DPSSs obtained by the tensor product of two 1D DPSSs), the 2D DPSSs are determined dynamically by the channel estimating module 438.

According to this variant, the 2D DPSSs to be used are chosen as a function of the characteristics of the propagation channel (particularly the maximum propagation time measured starting from the time elapsed between reception of the first symbol and the last echo corresponding to this symbol).

Then, during a step 52, the receiving station 43 waits for and then receives data blocks to be demodulated. In particular, this block includes pilots that will be used for the channel estimate.

Then, pilots are projected onto the selected two-dimensional DPSSs during a combination write step 53.

In order to make this projection, the first step is to calculate the channel decomposition coefficients $(d_i)_{i=1,\ldots,K}$ in the space containing 2D DPSSs kept starting from the transmitted reference symbols $(a_i)_{i=1,\ldots,K}$:

$$\begin{bmatrix} d_1 \\ \vdots \\ d_{N'} \end{bmatrix} = [P_1 \cdots P_{N'}]^\# \begin{bmatrix} a_1 \\ \vdots \\ a_k \end{bmatrix}$$

where:

N' is the number of selected DPSSs;

K is the number of pilots;

p is a 2D DPSS (N' 2D DPSSs kept) and p# is its pseudo inverse, as follows:

$$\begin{bmatrix} a_1 \\ \vdots \\ a_k \end{bmatrix} = [P_1 \cdots P_{N'}] \cdot \begin{bmatrix} d_1 \\ \vdots \\ d_{N'} \end{bmatrix}$$

The number K of pilot symbols used must be greater than or equal to the number N' of DPSSs kept. Remember that $P_{i(1 \leq i \leq N')}$ is a 2D DPSS, namely a vector with dimension K. Therefore, since K is greater than or equal to N', the number of channel decomposition coefficients $d_i$ is the same as the number of 2D DPSSs.

Pseudo-inverses are stored in a non-volatile memory (ROM) on the receiving station, for each processed block size (an estimating window size is usually defined corresponding to the size of the smallest block that can be transmitted) and each propagation environment.

Since the channel is noisy and the SNR (Signal/Noise Ratio) is assumed to be known, the result is an estimate of the channel decomposition coefficients $(a_i)_{i=1,\ldots,K}$ in the 2D DPSSs space using the least squares method (LSM).

$$\hat{a}i = \frac{\lambda_i}{\lambda_i + \frac{N_0}{E_s}} d_i$$

$\lambda_i$ is the eigenvalue of the $i^{th}$ 2D DPSS;

$N_0$ is the noise variance; and $E_s$ is the energy of pilots on reception.

The channel estimate $\hat{C}$ is then given by the following equation:

$$\hat{C} = [P_1 \cdots P_{N'}]^\# \begin{bmatrix} \hat{a}_1 \\ \vdots \\ \hat{a}_k \end{bmatrix}$$

Then, during a step 54, the channel estimating module 438 makes an estimate of the channel transfer function by interpolation of the estimate made on the pilots. Pilot symbols known to the receiver are used to obtain a discrete channel decomposition based on the 2D DPSSs. Knowledge of the channel at any point in the time-frequency network can then be obtained by transposition in the time base.

Figure 6:
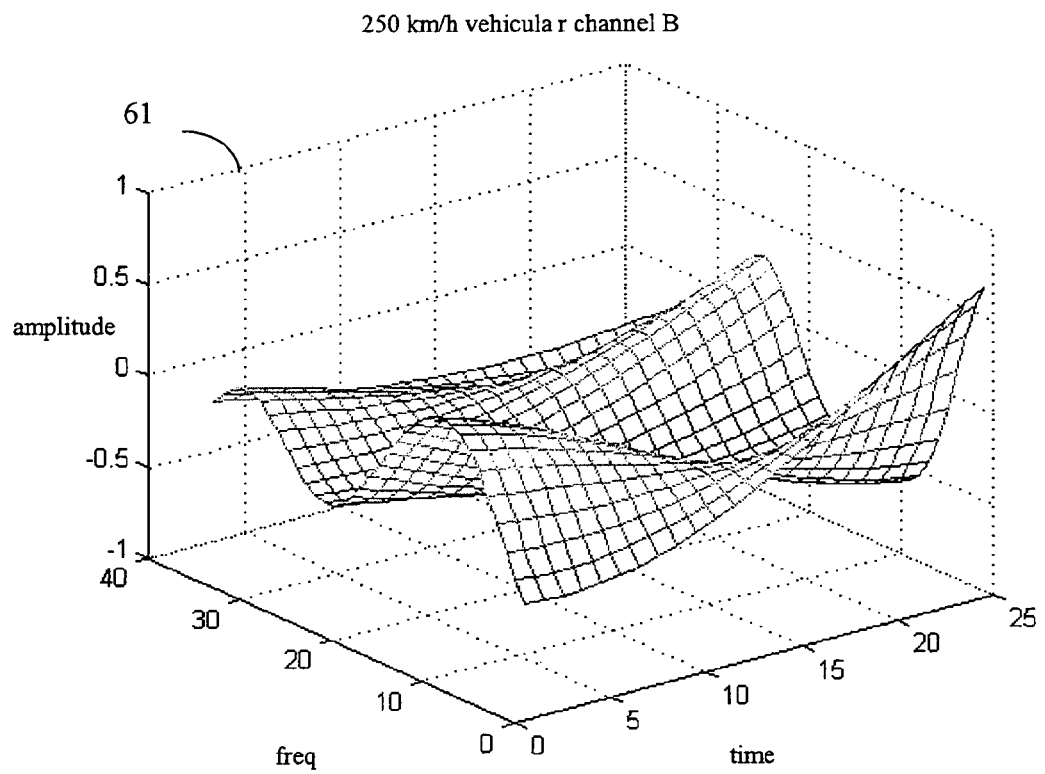
FIG. 6 illustrates a radio communication model known per se.

As an illustration, FIG. 6 show two-dimensional signals for a "Vehicular B" type channel at 250 km/h defined by the ETSI under reference "TR 101 112 V.3.2.0 appendix B.1 ETSI".

The precise channel characteristics are as follows:

The channel is a rural channel

The Doppler spectrum is a horn (spectrum corresponding to a power spectrum of a pure sine curve after propagation in a mobile channel with reflections assumed to be isotropic).

Delays (due to multiple paths) are summarised in the following table:

| Delay in nsec | Attenuation in dB |
| --- | --- |
| 0 | −2.5 |
| 300 | 0 |
| 8900 | −12.8 |
| 12900 | −10.0 |
| 17100 | −25.2 |
| 20000 | −16.0 |

The modulation is of the OFDM/IOTA type with the following parameters:

the IOTA symbol type is equal to 133.33 µs; and the space between subcarriers is equal to 3.75 kHz.

It is assumed that the channel is not noisy.

Figure 7:
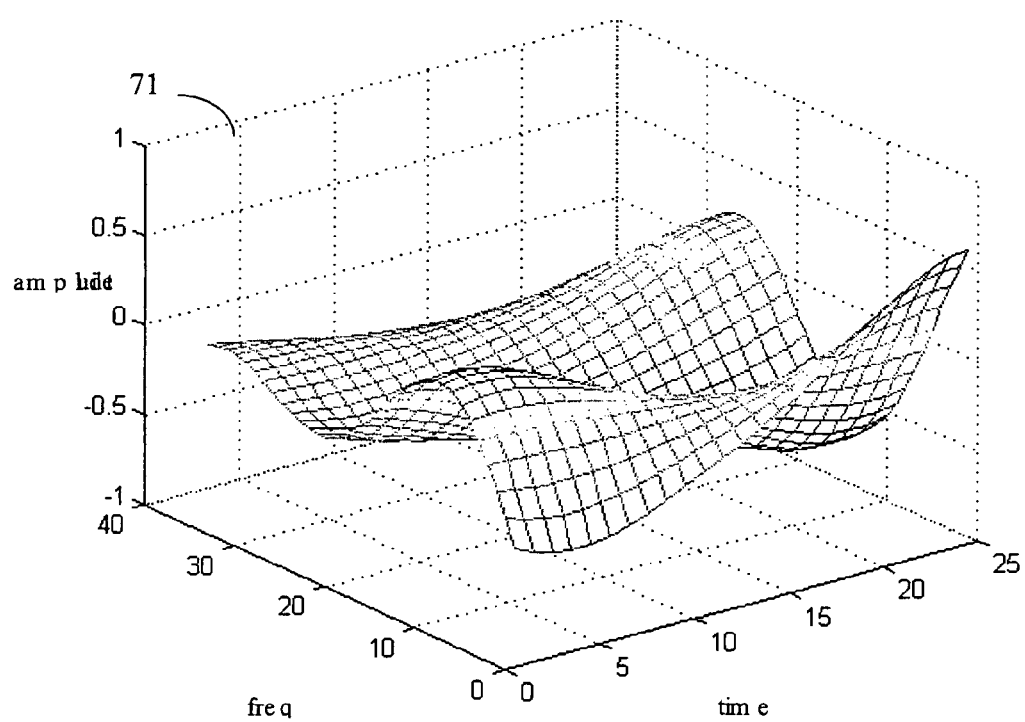
FIG. 7 illustrates the result of the channel estimate used in FIG. 5 and applied to the model illustrated in FIG. 6.

FIG. 7 illustrates the same channel as that illustrated in FIG. 6 but estimated according to the invention using 2D DPSSs.

The characteristics of 2D DPSSs are as follows:

the number of 2D DPSSs kept is equal to 25 the time pitch of pilot symbols is equal to 5 (so that four useful symbols can be obtained for one time reference symbol)

the frequency pitch of pilot symbols is equal to 8 (so that seven useful symbols can be obtained for one frequency reference symbol).

It can be seen that the channel according to the model described in FIG. 6 and its estimate according to invention are very similar. Thus, the channel estimate with two-dimensional DPSSs is very reliable and efficient.

Obviously, the invention is not restricted to the example embodiments mentioned above.

In particular, those skilled in the art could add any variant to the type of multicarrier modulation, particularly OFDM, which for example could be of the OFDM/QUAM or OFDM/OQAM type.

Note also that the invention can be used for applications in a wide variety of domains, particularly when high spectral efficiency is required and the channel is highly non-stationary, particularly when it is found that it would be judicious to use multicarrier modulation techniques.

A first category of applications relates to terrestrial broadcasting (for example, Digital Audio Broadcasting (DAB)), particularly for pictures, sound and/or data.

A second application category relates to digital radiocommunications. In particular, the invention can be used for applications in high-speed digital communication systems originating from or leading to mobiles (for example according to third generation mobile communication standards) and high speed LANs using multicarrier modulation techniques.

A third category of applications is submarine transmissions for which multicarrier modulation techniques are very suitable.

Therefore, in general, the invention can be used for applications in all domains in which multicarrier modulation techniques themselves are used (for example in systems combining Code Division Multiple Access (CDMA) and QFDM (particularly (multicarrier CDMA (MC-CDMA)).

The invention claimed is:

1. Method for estimating the transfer function for a multicarrier signal transmission channel formed by a series of symbols in time composed of a set of data elements, each of the data elements modulating a carrier frequency of the signal,
   the data elements comprising reference elements for which the transmission value is known to at least one receiver that will receive the signal, and information data elements representing at least one source signal to be transmitted,
   characterized in that it comprises:
      a step to determine a set of two-dimensional Discrete Prolate Spheroidal Sequences (DPSS);
      a step to write the transfer function in the form of a combination of at least some of the two-dimensional discrete prolate spheroidal sequences in the set;
      a two-dimensional interpolation step in time and in frequency of at least some coefficients of the combination, so as to obtain an estimate of the transfer function at all points in a time-frequency network;
   and wherein during the determination step, the method uses at least one step for selection of at least some of the discrete prolate spheroidal sequences (DPSSs), as a function of at least one characteristic of the transmission channel;
   and wherein the selection step uses a sub-step to sort the two-dimensional discrete prolate spheroidal sequences (DPSSs) as a function of a predetermined energy criterion ($Q_0$).

2. Method according to claim 1, characterized in that the write step uses a projection of the reference elements on the two-dimensional discrete prolate spheroidal sequences.

3. Method according to claim 2, characterized in that the characteristic(s) of the transmission channel include the maximum Doppler frequency ($f_d$) and/or the maximum channel delay spread ($T_{max}$).

4. Method according to claim 3, characterized in that the number of two-dimensional discrete prolate spheroidal sequences selected during the selection step takes account of at least one estimate quality criterion of the transfer function.

5. Method according to claim 2, characterized in that the number of two-dimensional discrete prolate spheroidal sequences selected during the selection step takes account of at least one estimate quality criterion of the transfer function.

6. Method according to claim 2, characterized in that the number of two-dimensional discrete prolate spheroidal sequences selected (N') during the selection step is less than or equal to the number of reference elements (K) of the signal.

7. Method according to claim 1, characterized in that the characteristic(s) of the transmission channel include the maximum Doppler frequency ($f_d$) and/or the maximum channel delay spread ($T_{max}$).

8. Method according to claim 1, characterized in that the number of two-dimensional discrete prolate spheroidal sequences selected during the selection step takes account of at least one estimate quality criterion of the transfer function.

9. Method according to claim 1, characterized in that the number of two-dimensional discrete prolate spheroidal sequences selected (N') during the selection step is less than or equal to the number of reference elements (K) of the signal.

10. Method according to claim 1, characterized in that during the determination step, a two-dimensional DPSS of the set is obtained by taking a tensor product of at least two single-dimensional DPSSs.

11. Method according to claim 1, characterized in that it uses an estimate-maximisation (EM) algorithm.

12. Method according to claim 1, characterized in that during the writing step, it includes at least one step for estimating at least some coefficients of the combination using a least squares method.

13. Method for reception of a digital signal, characterized in that it uses a step for estimating a transfer function of a transmission channel of the signal using the method according to claim 1.

14. Multicarrier signal receiver formed from a time sequence of symbols composed of a set of data elements, each of the data elements modulating a carrier frequency of the signal,
   the data elements comprising reference elements for which the value on emission is known to at least one receiver that will receive the signal, and also information data elements representing at least one source signal to be transmitted,
   characterized in that it includes:
      means of memorizing a set of two-dimensional discrete prolate spheroidal sequences (DPSSs);
      means for selection of at least some of the discrete prolate spheroidal sequences (DPSSs), as a function of at least one characteristic of the transmission channel, wherein said means for selection comprise means of sorting the two-dimensional discrete prolate spheroidal sequences (DPSSs) as a function of a predetermined energy criterion ($Q_0$);
      means of writing a transfer function for a transmission channel of the signal in the form of a combination of at least some of the two-dimensional discrete prolate spheroidal sequences in the set; and
      means of making a two-dimensional interpolation in time and in frequency of at least some coefficients in the combination, so as to obtain an estimate of the transfer function at all points in the time-frequency network.

15. Application of the estimating method according to claim 1 to at least one of the following domains:
   terrestrial digital broadcasting;
   digital radiocommunications;
   submarine data transmission.

* * * * *

UNITED STATES PATENT AND TRADEMARK OFFICE
CERTIFICATE OF CORRECTION

PATENT NO. : 7,242,721 B2
APPLICATION NO. : 10/479190
DATED : July 10, 2007
INVENTOR(S) : Alard et al.

It is certified that error appears in the above-identified patent and that said Letters Patent is hereby corrected as shown below:

Column 7:

At line 37, delete "$\dfrac{T_{max} x V_0}{2}$" and insert -- $W_f = \dfrac{T_{max} x V_0}{2}$ --

Signed and Sealed this
Fourteenth Day of June, 2011

David J. Kappos
*Director of the United States Patent and Trademark Office*